3,514,359
PROCESS OF UNITING OBJECTS OF POLYBUTENE-(1)

Albert Frese, Marl, Germany, assignor to Chemische Werke Huls Aktiengesellschaft, Marl, Germany, a corporation of Germany
No Drawing. Filed Oct. 11, 1965, Ser. No. 494,903
Int. Cl. C09j 5/06, 3/14; B32b 27/32
U.S. Cl. 156—308                                              3 Claims

ABSTRACT OF THE DISCLOSURE

Objects of polybutene-(1) can be adhesively united by (a) treating them with a liquid hydrocarbon which may contain dissolved polybutene-(1) and which may be substituted and which may be polymerizable, and (b) uniting them at a temperature in the range from 50° to 100° C. under pressure.

---

It is known that objects of polyolefines can not be united or only imperfectly by adhesion. For this reason it is necessary to employ other methods of uniting such objects such as welding. In the case of pipes, screw threads and flange joints are used.

Since adhesion is the least expensive method of uniting objects it has been attempted repeatedly to solve this problem. Hagen and Domininghaus in a publication entitled "Polyathylen und andere Polyolefine," 2nd edition, 1961, published by B. Garrels of Hamburg, Germany, state on page 348 that non-polar polyolefines do not adhere well and that the usual method applicable to many synthetic resins of dissolving the surface by means of a solvent and joining the parts under pressure is not suitable for objects of polyolefines.

In the foregoing and following descriptions the term polyolefines is used to mean polyethylene, polypropylene and also polybutene-(1).

It is known that objects of polyisobutylene can be united adhesively (see W. Hawerkamp, Chem. Ind. 16, 329 (1964), No. 6) but the same publication contains the usual statement regarding the poor adhesiveness of polyethylene and polypropylene so that the existing prejudice with reference to poly-n-butene persists. From the properties of polyisobutylene it cannot be concluded with respect to polybutene-(1) first that as a polymer of an isoolefine it is rubber like or second as a link in the chain of polymerized n-olefine that it is a solid synthetic. It is therefore exceptionally surprising that it is possible to adhesively unite polybutene-(1).

It has been found that objects of polybutene-(1) can be adhesively united by treating them with a liquid hydrocarbon which may contain dissolved polybutene-(1) and which may be substituted and which may be polymerizable and uniting them at a temperature in the range from 50° to 100° C. under pressure.

The name polybutene-(1) is used hereinafter to mean any synthetic resin made from butene-(1) by a known polymerization process and especially such products as are obtainable by the so-called Ziegler low pressure polymerization process.

Objects or articles of polybutene-(1) to be adhesively attached to each other include for instance pipes, profiles, plates, foils and the like as well as finished articles of all sorts which are brought to their final form or repaired by adhesion.

Suitable liquid hydrocarbons are e.g. paraffines such as heptane, benzine, diesel oil and paraffine oil, aromatic hydrocarbons such as benzene and xylene, cycloaliphatic hydrocarbons such as cyclohexane and isopropylcyclohexane and alkyl aromatic hydrocarbons such as tetrapropylene benzene and dodecylbenzene. Substituted hydrocarbons such as carbontetrachloride and chloroform also may be used. The alkylbenzene and especially tetrapropylenebenzene and dodecylbenzene are preferred.

Examples of suitable liquid polymerizable hydrocarbons are styrene and α-methylstyrene. These materials act additionally as adhesive agents in an advantageous manner to produce a durable bonding due to the self-polymerization thereof.

In order to obtain a rapid polymerization 0.001–1% and preferably 0.01–0.2% of a radical forming compound may be added to the polymerizable hydrocarbon. Examples of suitable radical formers that may be added are peroxides such as benzoyl peroxide, lauroyl peroxide, capryl peroxide, isopropylpercarbonate and p-methanehydroperoxide and also azo compounds such as azodiisobutyric acid dinitrile and azodivaleric acid nitrile.

In order to effect an advantageous lowering of the operating temperature it is advisable to add a suitable sensitizer such as sulfite, thiosulfate, hydrazine, mercaptan, methanol, oxalic acid, multivalent alcohols or ferrous sulfate to the radical-forming compound. These sensitizers are added in amounts within the range from 0.1 to 1000%, preferably from 0.5 to 250% based upon the radical-forming compound.

The liquid hydrocarbons may contain dissolved polybutene-(1) suitably in a concentration within the range from 1 to 10% by weight. For example a 5% solution of the polybutene-(1) in heptane or benzene is useful.

The liquid hydrocarbon can be applied in any suitable known way as by spreading or dipping.

In many instances, for instance in the use of a polybutene-(1) containing solution as the adhesive it is sufficient to treat only one of the two parts to be joined with the adhesive. However in general especially durable binding is obtained if both parts are treated. If desired, especially when using a high boiling solvent the coated parts can be exposed to the air for from 1 to 10 minutes before being brought together. This results in a presoaking of the surfaces and a partial evaporation of the excess solvent.

The pretreated parts to be adhesively connected are united at temperatures up to 100° C., preferably between 50° and 100° C. Lower or higher temperatures may be used but lower temperatures lengthens the time required to attain a permanent bonding while at temperature materially above 100° C. there is the danger of softening the pieces of thermoplastic synthetic resin being bonded.

During the bonding the parts to be bonded suitably are subjected to a pressure of from 5 to 20 and preferably from 5 to 10 atmospheres. Higher or lower pressures obviously may be employed but in general, in the absence of a special situation such as the bonding of a thin wall thickness, has no advantage.

In general it is sufficient in the bonding of relatively thin walled parts such as tubes, using dodecylbenzene as the bonding agent to operate at a temperature of 50° C. and at a pressure of 10 atmospheres for a period of 10 minutes. At higher temperatures as well as when using lower boiling solvents the time required may be considerably shortened.

A preferred embodiment of the invention is to coat the surfaces to be bonded together with a heated, e.g. boiling solution. The desired pressure can be applied in known manner e.g. by driving the end of a tube that has been treated externally with solvent into the widened end of another tube that has been treated internally with solvent.

The process of the present invention enables one to produce adhesive connections between objects whose tensile strength is not substantially less than that of the objects themselves. Especially good result are obtained when the objects to be joined, made of polybutene-(1) are bonded shortly after they are formed and while the resin is still in the unstable II modification.

It is especially surprising that this process, contrary to expectation effects a simple dissolving of the surfaces to be bonded by the action of a solvent.

In the following examples press plates 1 mm. thick were used. The strength of the press plates and of the adhesive joints were measured after ten days ageing at room temperature whereby comparable values were obtained for the stable modification I of the polybutene.

EXAMPLES 1–5

Two freshly prepared press plates of polybutene having an absolute tensile strength of 15.0 kg./1.5 cm. width of sample and a thickness of 1 mm. were coated with a 5% solution of polybutene in heptane, overlapped 1 cm. and treated for 10 minutes at the temperatures and pressures shown in the following table.

| Example | Pressure | Temp. °C. | Tensile strenght of adhesive joint (kg./1.5 cm. width) | Ratio of tensile strength of joint to tensile strength of press plate |
|---|---|---|---|---|
| 1 | 10 | 60 | 10.4 | 0.69 |
| 2 | 10 | 70 | 10.5 | 0.70 |
| 3 | 10 | 80 | 10.8 | 0.72 |
| 4 | 10 | 90 | 12.9 | 0.86 |
| 5 | 5 | 100 | 9.4 | 0.63 |

EXAMPLES 6–11

Two press plates of polybutene-(1) aged 10 days at room temperature and having an absolute tensile strength of 15.0 kg./1.5 cm. press plate width and a thickness of 1 mm. were thinly coated with the solutions shown in the following table, overlapped 1 cm. and pressed together for 10 minutes at 20 atmospheres presure and at 100° C. The strengths of the adhesive joints were measured as shown in the table.

| Example | Solvent | Tensile strength (kg/1.5 cm. width) of adhesive joint | Ratio of tensile strength of adhesive joint to tensile strength of test plate |
|---|---|---|---|
| 6 | Benzene | 12.4 | 0.83 |
| 7 | Tetrapropylene benzene | 14.3 | 0.95 |
| 8 | Alkylbenzene (alkyl=C$^{12}$) | 15.7 | About 1.00 |
| 9 | Paraffine oil | 13.0 | 0.87 |
| 10 | Chlorobenzene | 12.4 | 0.83 |
| 11 | Carbontetrachloride | 13.9 | 0.93 |

EXAMPLES 12–17

The test results shown in the following table are the results of tests similar to tests 6–11 but applied to freshly made press plates which had an absolute tensile strength of 23.5 kg./1.5 cm. width.

| Example | Solvent | Tensile strength (kg./1.5 cm. width) | Ratio of tensile strength of adhesive joint to tensile strength of press |
|---|---|---|---|
| 12 | Benzene | 23.7 | About 1.0 |
| 13 | Tetrapropylene benzene | 22.4 | 0.95 |
| 14 | Alkylbenzene (alkyl=C$^{12}$) | 21.1 | 0.9 |
| 15 | Paraffine oil | 22.1 | 0.94 |
| 16 | Chlorobenzene | 23.5 | 0.99 |
| 17 | Carbontetrachloride | 23.2 | 0.99 |

EXAMPLES 18–20

Two press plates of polybutene having an absolute tensile strength of 23.5 kg./1.5 cm. plate width and a thickness of 1 mm. which had been aged for 10 days at room temperature were dipped for a short time into paraffine oil, heated to 120° C., overlapped 1 cm. and then pressed together for 10 minutes under 5 atmospheres pressure. The pressing temperature, the strengths of the adhesive joints and the ratios of the strengths of the adhesive joints to the strength of the press plates are shown in the following table.

| Example | Temp. of paraffine oil (°C.) | Press Temp. (°C.) | Tensile strength of adhesive joint (kg./1.5 cm. width) of test piece | Ratio of tensile strength of joint to tensile strength of test piece |
|---|---|---|---|---|
| 18 | 120 | 100 | 24.0 | About 1.00 |
| 19 | 120 | 90 | 20.6 | 0.88 |
| 20 | 130 | 100 | 25.3 | About 1.00 |

EXAMPLES 21–23

Two press plates of polybutene-(1) having an absolute tensile strength of 26.3 kg./1.5 cm. width and a thickness of 1 mm. were coated with styrene at 90° C., overlapped 1 cm. and pressed together for 10 minutes at the temperatures and pressures shown in the following table. The resulting adhesive joints were not swollen and therefore of accurate size. The absolute tensile strengths and the ratios of the tensile strengths of the adhesive joints to the tensile strengths of the test plates are shown in the table.

| Example | Pressure atm. | Temp., °C. | Tensile strength of adhesive joint (kg./1.5 cm. width) | Ratio of tensile strength of joint to that of press plate |
|---|---|---|---|---|
| 21 | 10 | 90 | 20.1 | 0.76 |
| 22 | 10 | 100 | 23.9 | 0.91 |
| 23 | 20 | 100 | 25.3 | 0.96 |

EXAMPLES 24–26

Two press plates of polybutene-(1) having an absolute tensile strength of 26.3 kg./1.5 cm. test piece width and a thickness of 1 cm. were treated with styrene and activators is shown in the following table, overlapped 1 cm. and pressed together for 10 minutes at 10 atmospheres pressure and 90° C. The products had hard (i.e., permanently bonded) joints and accurate dimensions.

| Example | Activator | Tensile strength of adhesive joint (kg./1.5 cm. width) | Ratio tensile strength of joint to tensile strength of test piece |
|---|---|---|---|
| 24 | 0.1% benzoyl-peroxide | 24.5 | 0.93 |
| 25 | 0.1% azodiisobutyric acid dinitrile | 24.2 | 0.92 |
| 26 | 0.1% lauroylperoxide and 0.2% methanol | 25.0 | 0.95 |

EXAMPLE 27

Two press plates of polybutene-(1) having an absolute tensile strength of 26.3 kg./1.5 cm. test piece width and a thickness of 1 mm. were coated with α-methylstyrene containing 0.1% of caprylperoxide, the coated pieces were overlapped 1 cm. and pressed together for 10 minutes at 10 atmospheres pressure and 90° C. The absolute tensile strength of the adhesive joint was 23.7 kg./1.5 cm. test piece width. The ratio of the absolute tensile strength of the adhesive joint to the absolute tensile strength of the press plates was 0.90.

I claim:
1. Process of permanently bonding pieces of polybutene-(1) together which comprises wetting the surfaces to be joined with a liquid selected from the group consisting of heptane, benzine, diesel oil, paraffine oil, benzene, xylene, cyclohexane, isopropylcyclohexane, tetrapropylene benzene, dodecylbenzene, chloroform, chlorobenzene and carbontetrachloride, said liquid containing dissolved therein a polymerizable hydrocarbon selected from the group consisting of styrene and methylstyrene, and pressing the wetting surfaces together at a temperature of from 50° to 100° C.

2. Process as defined in claim 1, in which the liquid contains a radical-forming polymerization catalyst in an amount within the range from 0.001 to 1.0% by weight.

3. Process as defined in claim 2, in which the liquid contains a sensitizer selected from the group consisting of sulfite, thiosulfate, hydrazine, mercaptan, methanol, oxalic acid, multivalent alcohols and ferrous sulphate, said sensitizer being present in an amount within the range from 0.1 to 100.0% by weight based upon the weight of the radical-forming polymerization catalyst.

References Cited

UNITED STATES PATENTS

| | | | |
|---|---|---|---|
| 3,201,302 | 8/1965 | Williams et al. | 161—252 |
| 3,215,580 | 11/1965 | Benning et al. | 156—332 |
| 3,231,650 | 1/1966 | Findlay et al. | 156—305 X |
| 3,247,157 | 4/1966 | Reed et al. | 260—33.6 |

OTHER REFERENCES

Ellis, Carleton: The Chemistry of Synthetic Resins, vol. 1, Reinhold Pub. Corp., New York, 1935, p. 50.

JOHN T. GOOLKASIAN, Primary Examiner

R. A. KILLWORTH, Assistant Examiner

U.S. Cl. X.R.

156—333, 334; 161—188, 252; 260—33.6

UNITED STATES PATENT OFFICE
CERTIFICATE OF CORRECTION

Patent No. 3,514,359　　　　　　　　　Dated May 26, 1970

Inventor(s) ALBERT FRESE

It is certified that error appears in the above-identified patent and that said Letters Patent are hereby corrected as shown below:

Claim 3, column 5, line 6 "100.0%" should be -- 1000% --

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents